Oct. 2, 1923.  1,469,585
J. C. McCUNE
FLUID PRESSURE BRAKE DEVICE
Filed Oct. 4, 1921
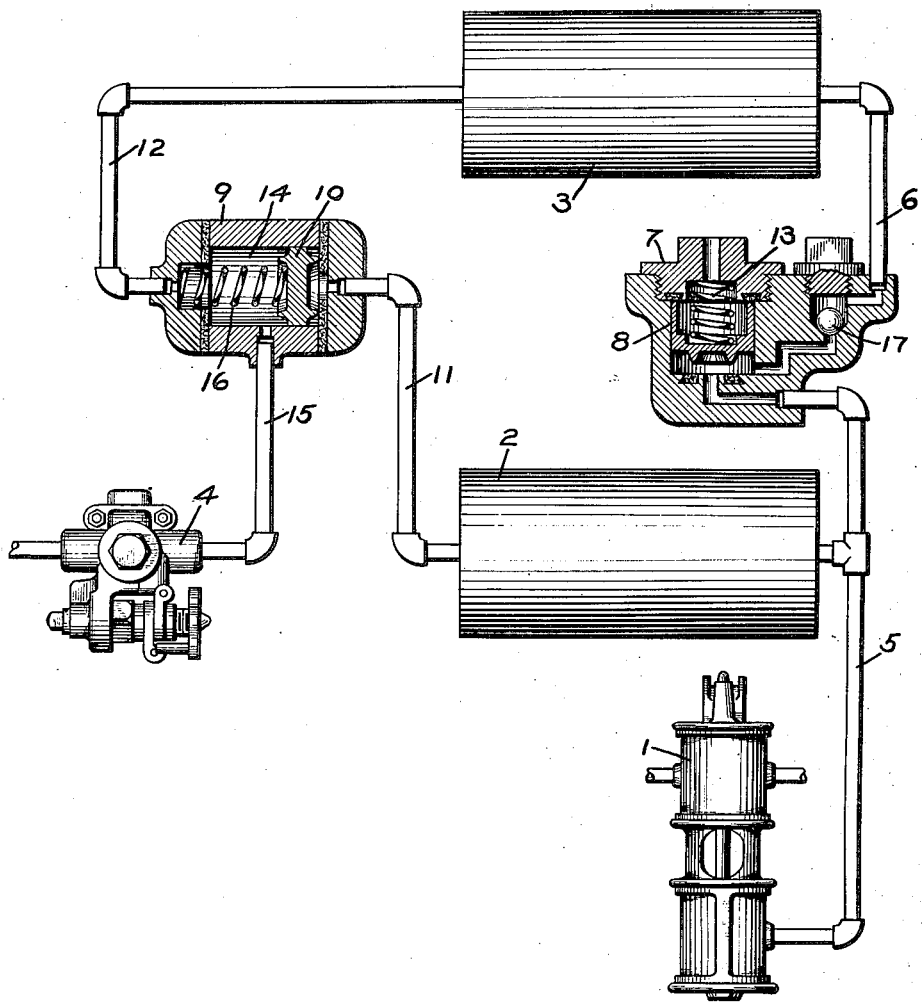
INVENTOR
JOSEPH C. McCUNE
BY
ATTORNEY Patented Oct. 2, 1923.

1,469,585

UNITED STATES PATENT OFFICE.

JOSEPH C. McCUNE, OF ORANGE, NEW JERSEY, ASSIGNOR TO THE WESTINGHOUSE AIR BRAKE COMPANY, OF WILMERDING, PENNSYLVANIA, A CORPORATION OF PENNSYLVANIA.

FLUID-PRESSURE-BRAKE DEVICE.

Application filed October 4, 1921. Serial No. 505,300.

*To all whom it may concern:*

Be it known that I, JOSEPH C. McCUNE, a citizen of the United States, residing at Orange, in the county of Essex and State of New Jersey, have invented new and useful Improvements in Fluid-Pressure-Brake Devices, of which the following is a specification.

This invention relates to fluid pressure brakes and the principal object of the invention is to provide means for preventing loss of the brakes through failure of the fluid pressure supply by reason of rupture of the main reservoir or breakage of the main reservoir pipe.

In the accompanying drawing, the single figure is a diagrammatic view, partly in section, of an apparatus for supplying fluid under pressure to the brake system and embodying my invention.

As shown in the drawing, the apparatus includes a fluid compressor 1 and main reservoirs 2 and 3, from which fluid under pressure is supplied to the usual feed valve device 4.

As is usual on a locomotive fluid pressure brake equipment, two main reservoirs are employed, which have heretofore been connected to act as a single reservoir, and should the main reservoir pipe break, fluid pressure for operating the brakes would be lost and therefore the brakes could not be applied.

According to my invention, means are provided so that fluid under pressure may be supplied from either reservoir and if the main reservoir pipe to one reservoir should break, this reservoir will be cut off and fluid under pressure will be supplied from the other reservoir to the feed valve device for controlling the brakes.

Fluid compressed by the compressor 1 is supplied through a pipe 5 to the reservoirs 2 and 3 but interposed between pipe 5 and pipe 6, leading to the reservoir 3, is a valve device 7 comprising a casing containing a valve piston 8, subject on one side to the pressure of a coil spring 13, for controlling communication from pipe 5 to pipe 6.

A double check valve device 9 is also provided which comprises a casing containing a double check valve 10, having one side of the check valve connected to the supply pipe 11 from the reservoir 2 and the other side to the supply pipe 12 of the reservoir 3. At an intermediate point, the valve chamber 14 is connected to pipe 15, leading to the feed valve device 4.

In operation, if there is no fluid pressure in the system, the compressor 1 operates to compress fluid into the reservoir 2 and at first, since there is no pressure in the reservoir 3, the double check valve 10 will be shifted to the left against the pressure of the coil spring 16, so that communication between the supply pipe 11 of the reservoir 2 and the feed valve pipe 15 is established, while the supply pipe 12 of the reservoir 3 is cut off. Fluid under pressure from the reservoir 2 is therefore available for braking purposes.

When the pressure in reservoir 2 has been increased to a predetermined degree, the valve piston 8 will be lifted from its seat against the pressure of spring 13, so that fluid under pressure will now be supplied to reservoir 3, past the check valve 17 and through pipe 6. Upon substantial equalization of fluid pressure upon opposite sides of the double check valve 10, the spring 16 will shift the double check valve to the right, as shown in the drawing, so that fluid under pressure will now be supplied from the reservoir 3 through pipe 12 to the feed valve pipe 15, while the supply pipe 11 is cut off.

If the supply pipe 12 should break, the pressure will be reduced at the left of the double check valve 10 and the higher pressure supplied through pipe 11 will effect the shifting of the double check valve 10 to the left, cutting off communication from the broken supply pipe 12 and opening communication from the supply pipe 11 to the feed valve pipe 15, so that fluid under pressure is now supplied from the reservoir 2 for controlling the brakes, thus preventing loss of the brakes, by the breakage of the supply pipe 12.

The drop in pressure in the reservoir 3 due to the broken supply pipe 12, causes a reduction in pressure below the valve piston 8 and when the pressure has dropped to a predetermined degree, for example, 60 pounds, the valve piston will be shifted to its lower seat, thus cutting off communication from the pipe 5 to the reservoir 3.

If the supply pipe 11 should break, the double check valve 10 normally closing communication from the supply pipe 11, fluid under pressure is supplied from the reservoir 3 through the supply pipe 12 as is normally the case.

Loss of pressure from the reservoir 3 is prevented by the check valve 17, as well as by the closing of the valve piston 8, when the pressure in the reservoir 2 is reduced through breakage of the pipe 11.

Having now described my invention, what I claim as new and desire to secure by Letters Patent, is:—

1. The combination with two main reservoirs normally charged with fluid under pressure, of a valve device for controlling communication from said reservoirs through which fluid under pressure is supplied for controlling the brakes and operated upon a reduction in pressure in one reservoir for closing the supply communication from said reservoir and for establishing the supply communication from the other reservoir.

2. The combination with two main reservoirs normally charged with fluid under pressure, of a valve device normally providing a communication for supplying fluid from one reservoir and operated upon a reduction in pressure in said reservoir for cutting off said communication and for establishing communication for supplying fluid from the other reservoir.

3. The combination with two main reservoirs normally charged with fluid under pressure, of a double check valve subject to the opposing pressures of said reservoirs for controlling communication through which fluid under pressure is supplied for controlling the brakes.

4. The combination with two main reservoirs normally charged with fluid under pressure, of a double check valve subject on one side to the pressure of one reservoir and a spring and on the opposite side to the pressure of the other reservoir for controlling communication through which fluid under pressure is supplied for controlling the brakes.

5. The combination with a main reservoir, of a valve device operated upon a predetermined reduction in pressure in said reservoir for cutting off communication through which said reservoir is charged with fluid under pressure.

6. The combination with a main reservoir, of a valve device subject to the pressure of fluid supplied to said reservoir and operated upon a predetermined reduction in the fluid pressure for cutting off communication through which said reservoir is charged.

7. The combination with two main reservoirs normally charged with fluid under pressure, of a valve device subject to the opposing pressures of said reservoirs for controlling communication through which fluid under pressure is supplied from said reservoirs and valve means normally establishing communication betwen said reservoirs and operated upon a predetermined reduction in pressure in one reservoir for closing said communication.

8. The combination with two main reservoirs normally charged with fluid under pressure, of a double check valve operated upon a reduction in pressure in one reservoir for cutting off communication through which fluid under pressure is supplied from said reservoir and for opening communication through which fluid under pressure is supplied from the other reservoir and a valve piston normally providing communication through which the first mentioned reservoir is charged with fluid under pressure and operated upon a predetermined reduction in pressure in said reservoir for cutting off said communication.

In testimony whereof I have hereunto set my hand.

JOSEPH C. McCUNE.